Nov. 23, 1965 D. COSTES 3,219,540
REFLECTORS FOR NUCLEAR REACTORS HAVING
REMOVABLE SOLID MODERATOR ELEMENTS
Filed May 9, 1962 2 Sheets-Sheet 1

Nov. 23, 1965   D. COSTES   3,219,540
REFLECTORS FOR NUCLEAR REACTORS HAVING
REMOVABLE SOLID MODERATOR ELEMENTS
Filed May 9, 1962   2 Sheets-Sheet 2
FIG. 5
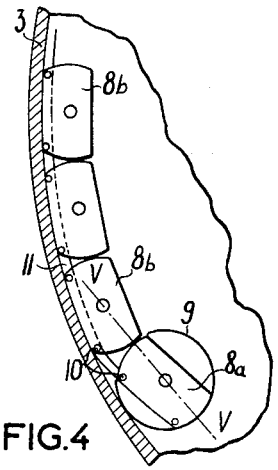
FIG. 4
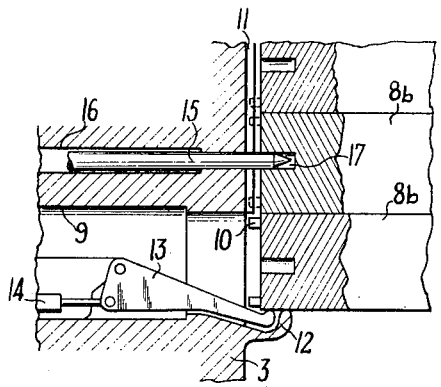
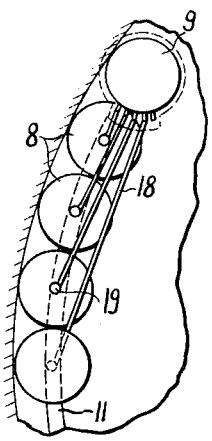
FIG. 6
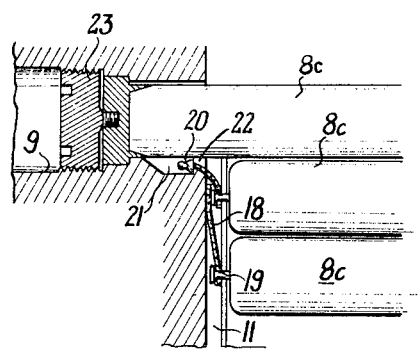
FIG. 7

3,219,540
REFLECTORS FOR NUCLEAR REACTORS HAVING REMOVABLE SOLID MODERATOR ELEMENTS

Didier Costes, Paris, France, assignor to Commissariat a l'Énergie Atomique, Paris, France
Filed May 9, 1962, Ser. No. 193,379
Claims priority, application France, May 17, 1961, 862,148
2 Claims. (Cl. 176—42)

The present invention relates to nuclear reactors provided with pressure tubes and a liquid moderator and relates more especially in reactors of this type to those in which a reflector constituted by a stack of solid moderator elements surrounds the core in which the fuel elements are located.

It is known that the design of reactors of this kind with a tank which is surrounded externally at least partially by a reflector of moderator material such as graphite, for example, gives rise to a certain number of difficulties especially as regards the cooling of this portion of the reactor and as regards the precautions to be taken for the purpose of periodically releasing the Wigner energy which is stored in the graphite. It is additionally necessary to take into account the fact that the tank itself must in this case be made of a metal having a low neutron absorption capacity, which in practice excludes steel.

The invention has for its object to facilitate the construction of these reactors and to improve their operation by forming the reflector by means of periodically replaceable elements especially with a view to permitting the possibility of releasing the Wigner energy which is stored in the said elements.

A further object of the invention is to effect an appreciable saving in the quantity of liquid moderator employed by replacing this latter, in a region in which the neutron flux is relatively low, by solid moderator elements which are less costly and have similar neutron-reflecting properties.

To this end, a nuclear reactor constructed in accordance with the invention is characterized in that the internal wall of the reactor tank is lined with canned and removable elements of solid moderator material.

Apart from this principal arrangement, the invention consists of various secondary arrangements which relate more especially to the means employed for inserting, guiding or withdrawing the canned elements of solid moderator in the interior of the reactor tank.

The present invention will in any case be made clear with reference to the complementary description which follows below as well as the accompanying drawings, it being understood that the said complementary description and drawings are given chiefly by way of indication.

FIGS. 4 and 5 show one portion of the reflector seen on a larger scale in partial cross-section similar to FIG. 3 and in cross-section taken along the line V—V of FIG. 4.

Finally, FIGS. 6 and 7 are views similar to those of FIGS. 4 and 5, corresponding to another form of embodiment of the invention.

Figure 1:
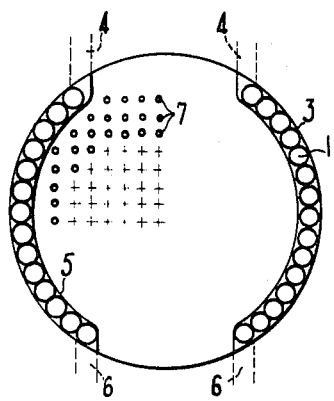
FIG. 1 illustrates very diagrammatically in cross-section a reactor tank fitted with a reflector which is formed in accordance with the invention.

As can be seen in FIG. 1, the reflector of a nuclear reactor designed in accordance with the invention is composed, in the interior of the tank 3, of a stack of solid elements 1 of graphite, for example, which are preferably covered by a very thin impervious casing which has a very low neutron-absorption capacity. The elements referred-to above are inserted into the tank 3 of the reactor through conduits such as the conduit 4 and are assembled together in a row along the walls of the said tank, irrespective of the shapes of the said walls. In order to hold the elements 1 in position, there is placed at a certain distance from the wall of the tank 3 a second wall 5 of very lightweight and relatively non-impervious material, for example a grid which is held in position by means of rods of appropriate length which are either embedded in the tank itself or secured in any like manner. The space to be filled which thus surrounds the reactor core, in which the pressure tubes are designated by the reference 7, is supplied with elements through the conduits 4; similarly, this space can be vacated by means of extraction conduits 6 which are similar to the aforementioned conduits 4.

Figure 2:
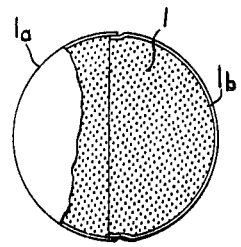
FIG. 2 shows in elevation and in partial cross-section moderator element of solid materials for use in the reflector.

The cross-section and shape of the moderator elements which line the reactor tank can be of any kind desired. The said elements are preferably constituted by prismatic rods of graphite having a cross-section which is either circular, as shown in FIG. 2, or approximately rectangular, as shown in FIGS. 3 to 6. The cladding of the elements 1 is formed, for example, by two half-shells 1a and 1b joined together by brazing or by welding and made of a suitable material such as zirconium or magnesium.

In a general sense, the cross-sectional profile of the elements is chosen as a function of the shape itself of the reflector to be formed, that is to say of the shape of the surface of the tank 3 to be lined. It is also advisable to contemplate two cases according to the arrangement adopted for the reactor tank.

If the tank has a vertical axis and is provided with a removable cover, the elements can be inserted directly from the top with the cover removed and can be held against the tank wall by appropriate anchoring means.

Figure 3:
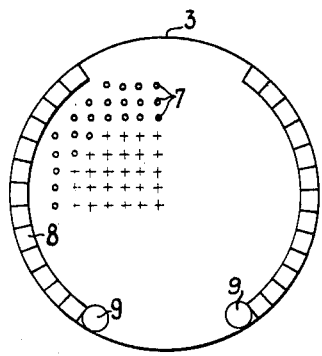
FIG. 3 is a figure which is similar to FIG. 1 but corresponding to another form of embodiment of the invention.

If the tank has cylindrical walls along a horizontal axis, the elements 8 of FIG. 3 are inserted in a horizontal direction through side openings such as the opening or conduit 9 and are then directed up to their utilization positions by virtue of guiding means while bearing against each other if so required.

As shown in FIGS. 4 and 5, the said guiding means are provided, for example, with studs or nipples 10 which are formed on the ends of the elements 8b and 8c and are adapted to slide in slideways such as the slideway 11 formed in the reactor wall.

At the time of introduction and placing in position of the elements referred-to above, steps can consequently be taken so that: either each element is inserted through an opening or conduit 9 provided at the base of the reactor, in combination with means for pushing upwards the element which has been previously inserted, and so forth (as shown in FIGS. 4 and 5), or alternatively the said elements are inserted through an opening or a conduit 9 provided at the top and are moved downwards successively with the assistance of retaining means such as cables, as shown in FIGS. 6 and 7.

In accordance with the form of embodiment of FIGS. 4 and 5, an element 8 is brought in through one of the conduits 9 and placed in position so as to rest at both ends on abutments such as the abutment 12. The said element is then gripped by lifting means consisting, for example, of arms 13 operated by jacks 14 in such manner as to move from a bottom position to a top position in which the said element is held by a momentary-locking device consisting of rods 15 which can be operated from the exterior through conduits 16 and can accordingly be permitted to penetrate into orifices 17 formed in the corresponding ends of the elements 8b.

At this moment, a new element 8b can then be inserted and the previous operation repeated until the number of elements 8 is sufficient to line the wall of the tank 3 while remaining in this position by virtue of the studs 10 and the slideways 11.

The removal of the elements is carried out in the same manner in the reverse direction, the conduits such as the conduit 9 and 16 being kept closed in normal service by means of appropriate plugs.

In accordance with the form of embodiment which is illustrated in FIGS. 6 and 7, the insertion of the elements 8c is effected through conduits 9 disposed at the top portion of the reactor by means of cables 18 which permit the said elements to be lowered successively into their various positions, the said cables being operated in the reverse direction for the extraction operation.

The ends of the elements 8c are provided for this purpose with studs 19 to which are attached the cables 18, the ends of which are fitted with retaining caps 20, the studs 19 having the same function in this case as the studs 10 in relation to a slideway 11.

For the purpose of the insertion and positioning of the elements 8c, the cables 18 are employed in conjunction with lateral recesses 21 and grooves such as the groove 22 against which the retaining caps 20 are brought to rest in the position of operation of the corresponding element 8 inside the tank. In order to remove the elements, it is merely necessary to pull the cables 18 of the uppermost element 8c so as to withdraw this latter through the passage 9 and so forth.

In FIG. 7, there has been illustrated the top element 8c with a sealing plug 23 which serves to close-off the conduit 9.

It will be understood that the present invention is in no way limited to those examples which have been described and illustrated but that, on the contrary, the invention is intended to include within its scope all alternative forms.

What I claim is:

1. In a heterogeneous nuclear reactor of the horizontal pressure-tube type, a tank, an internal surface for said tank, a heavy water liquid moderator filling said tank, an internal lining for said tank on said internal surface consisting of removable prismatic canned elements of solid graphite moderator material extending substantially the length of said tank and covered with a material having a low neutron-absorption capacity, means for holding said canned elements against the internal surface of said tank with said liquid moderator in contact with said canned elements, at least one opening in said tank for insertion of said moderator elements and said means consisting of a thin wall pervious to said liquid moderator spaced internally from said internal surface.

2. A nuclear reactor as described in claim 1, said thin wall being a grid.

References Cited by the Examiner
UNITED STATES PATENTS

| | | | |
|---|---|---|---|
| 2,736,696 | 2/1956 | Wigner et al. | 176—52 |
| 2,787,593 | 4/1957 | Metcalf | 176—53 |
| 2,929,768 | 3/1960 | Mahlmeister et al. | 176—41 |
| 3,124,514 | 3/1964 | Koutz et al. | 176—55 X |

FOREIGN PATENTS 797,485   7/1958   Great Britain.

OTHER REFERENCES

Parkins: Proceedings on the International Conference on the Peaceful Uses of Atomic Energy, vol. 3, August 1955, pp. 299–303. T5900815.

TID–5275, Research Reactors, August 1955, pp. 332–350, 356, 357, and 378. QC787N8R4.

REUBEN EPSTEIN, *Primary Examiner.*

CARL D. QUARFORTH, BENJAMIN R. PADGETT,
*Examiners.*